March 14, 1939. N. E. HENDRICKSON 2,150,622
LOAD CUSHIONING
Filed Oct. 14, 1937  2 Sheets-Sheet 1
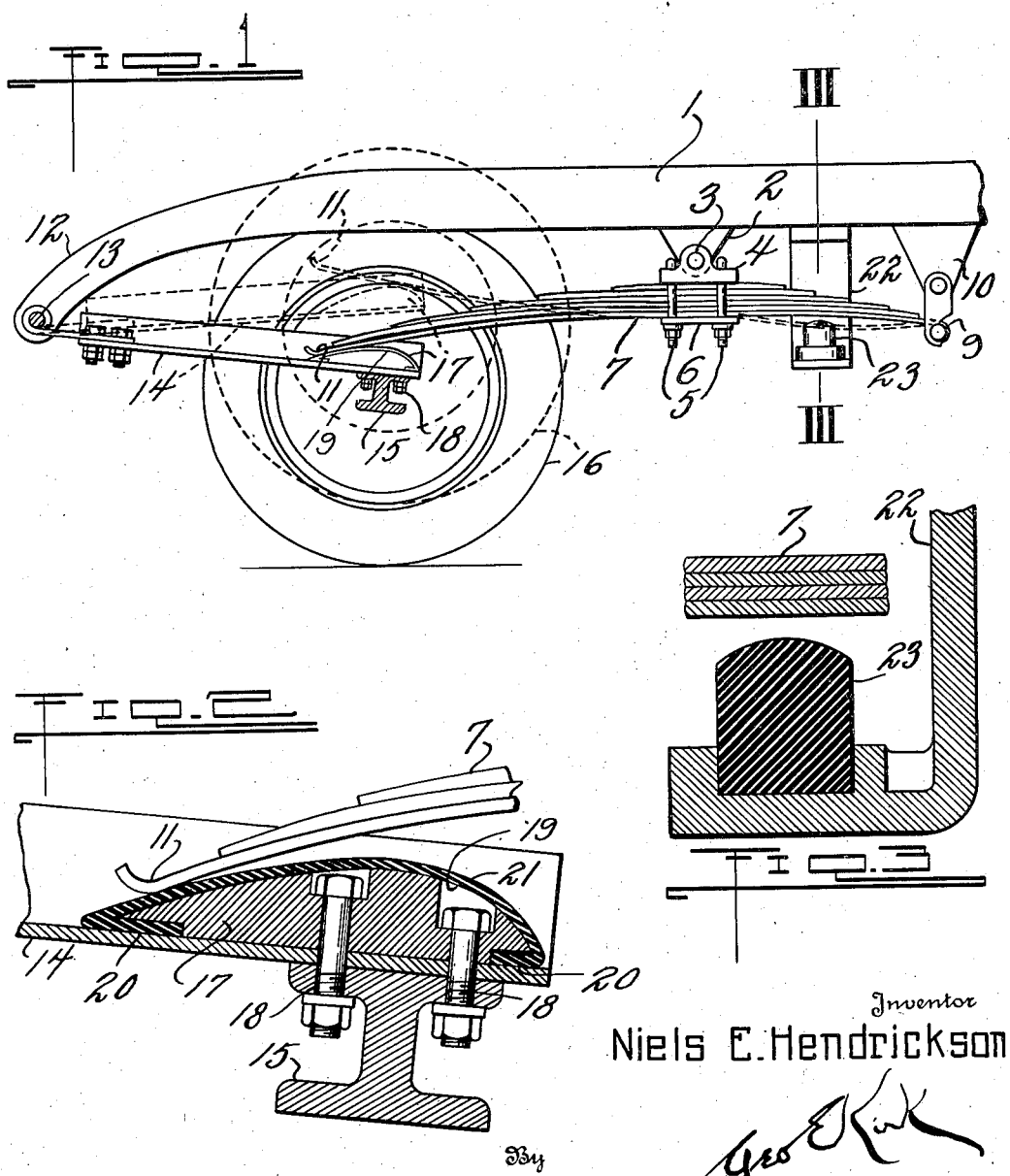
Inventor
Niels E. Hendrickson March 14, 1939. N. E. HENDRICKSON 2,150,622
LOAD CUSHIONING
Filed Oct. 14, 1937 2 Sheets-Sheet 2
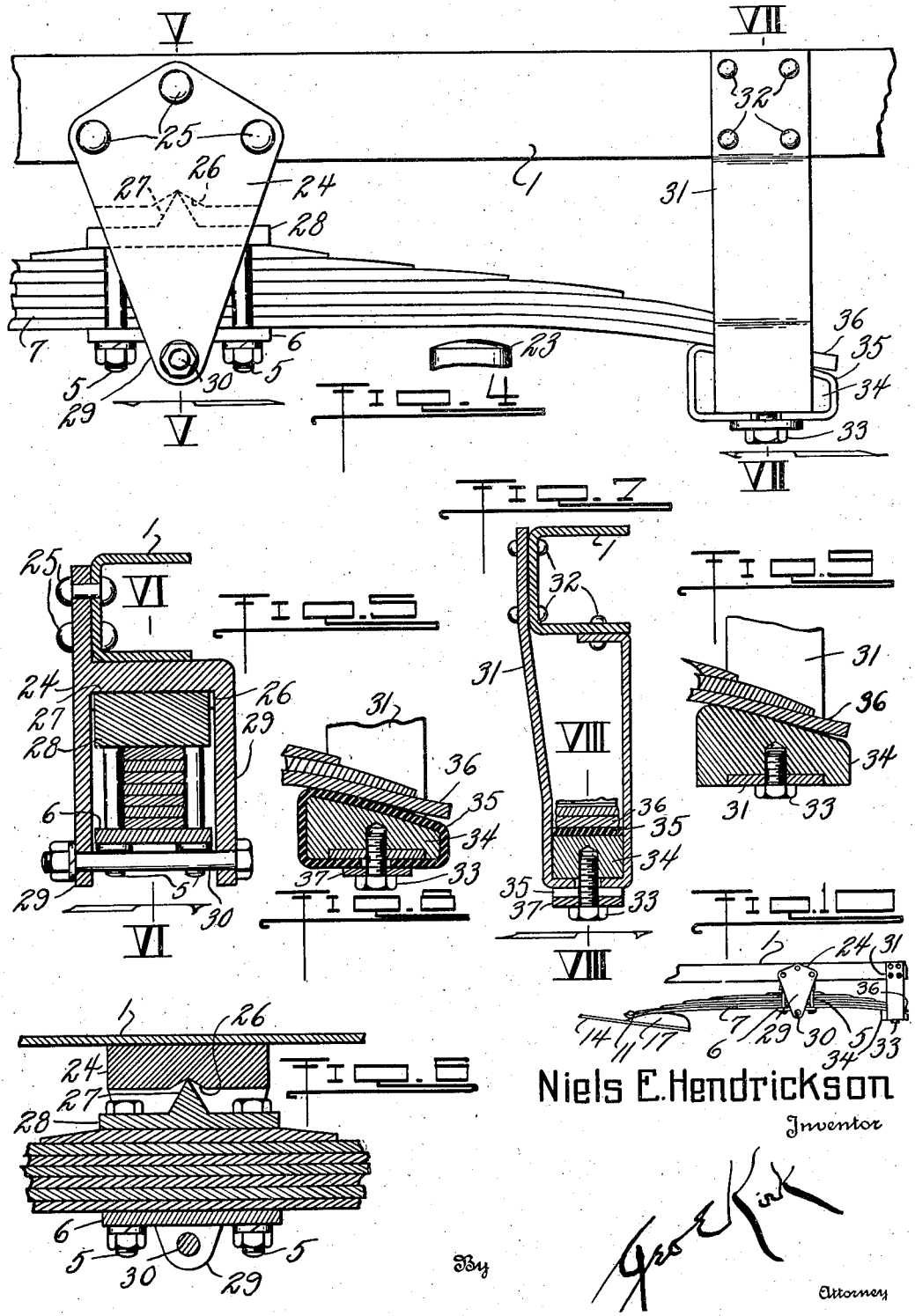
Niels E. Hendrickson
Inventor Patented Mar. 14, 1939

2,150,622

UNITED STATES PATENT OFFICE 2,150,622

LOAD CUSHIONING

Niels E. Hendrickson, Toledo, Ohio, assignor to The Mather Spring Company, Toledo, Ohio, a corporation of Ohio Application October 14, 1937, Serial No. 168,998

13 Claims. (Cl. 267—41)

This invention relates to smoothing out impact and load variation disturbances in vehicles.

This invention has utility when incorporated between axles or journal mountings or trucks for vehicle wheels and the vehicle body, especially in connection with leaf springs even of the semi-elliptic type.

Referring to the drawings:

Fig. 1 is a fragmentary side elevation of a wheel mounting as to a vehicle body incorporating the invention herewith and showing in dotted lines some range of cushioning from impact or load;

Fig. 2 is a detail view on an enlarged scale of the coacting compressible cam face between the spring free end and the radius rod or arm in providing a seat therebetween;

Fig. 3 is a section on the line III—III, Fig. 1, showing the yieldable spring flexing feature between the shackle and the spring primary holder or mounting;

Fig. 4 is a fragmentary view of a semi-elliptic spring having terminal guide or cam instead of shackle as shown in Fig. 1;

Fig. 5 is a section through the rockable mid-holder on the line V—V, Fig. 4;

Fig. 6 is a section on the line VI—VI, Fig. 5, longitudinally of the spring at the rockable bearing mid-holder;

Fig. 7 is a section on the line VII—VII, Fig. 4, of the cam guide terminal for the spring;

Fig. 8 is a section on the line VIII—VIII, Fig. 7, through this terminal cam guide holder;

Fig. 9 is a view similar to Fig. 8 of this terminal guide holder with the spring directly bearing thereon instead of spaced by a cushion or rub-taking means; and Fig. 10 is a diagrammatic view on a reduced scale of the spring of Fig. 4.

Vehicle frame 1 is shown with bracket 2 having pivot pin 3 mounting plate 4 connected by bolts 5 with opposing plate 6 and providing primary holder for leaf spring 7, shown as the semi-elliptic type having at one end an eye connected by swinging shackle 9 with bracket 10, also mounted on the vehicle body 1. There is accordingly provided the shackle for one end of this spring 7, a mid-holder therefor, and remote from this shackle a free end 11.

The frame or chassis 1 is shown as having depending arm 12 with pivot pin 13 therein, to which is connected swinging arm 14 as a radius rod to axle 15 mounting wheel 16, freely rotatable in its mounting connection with such axle, and through such axle transmitting load variation disturbances and impacts to the body 1 as cushioned or smoothed out by the cooperation between the arm 14 and the spring 7. This arm 14 is provided with cam 17, anchored therewith by bolts 18, which assemble the arm 14 with the axle 15. This cam 17 may be designed of contour to respond in controlling variation in effective length of the arm 14 and its proportional variation with the effective length of the spring 7 as to the cooperating portion of its free end 11 in its spacing from the mid-holder portion as mounted on the pivot pin 3.

In practice hereunder, for delicacy of variation in load response as against bumpy or non-smooth operation, advantage is found in providing facing 19 for the cam 17 between such cam 17 and the free end 11 of the spring 7. This facing is desirably of rubber, say as fabric reinforced, and which may be anchored with the cam 17 by having reverse bend terminal portions 20 clamped under the cam 17.

There is thus a holding for this face which will cooperate in smoothing out, and in this operation it may even be desirable to provide graphite coating 21 on this face 19, thereby eliminating binding action. The spring 7 is accordingly smoothly responsive at its free end and this response is effective between the mid-holder and the shackle in tendency to flex or warp such portion of the spring. Supplemental reaction in this smoothing control is accordingly available in providing bracket 22 in mounting cushion block 23 as a compressible rubber-like buffer, which as the spring 7 flexes thereagainst is a yieldable response in further controlling this spring 7 in the load cushioning for smoothing out the reaction against bumps.

Spring 7 in lieu of the mid-holder 4, 5, 6, may comprise bracket 24 (Figs. 4, 5, 6) anchored to the frame 1 by rivets 25. This bracket 24 has V-bearing seat 26 of a wider spread than a complementary or opposing V-bearing projection 27 rising from block 28, assembled by bolts 5 with block 6 of the clamp. This mid-holder clamp bracket 24 has depending side ears 29 extending below the plate 6 and there clamped by bolt 30. Spaced from this mid-holder having the bracket 24 is bracket 31 anchored with the frame 1 by rivets 32 (Figs. 4, 7). This bracket 31 has bolt 33 anchoring block 34 together with composition facing 35, say of rubber and fabric providing a cam against which may ride spring terminals or free end 36 in flexing thereon not only to change the distance of effective action but the direction therefor as the load is applied. This composition is assembled in position with the bracket by the bolt 33 having washer 37.

In some practice it may be in order to omit this quieting facing 35 and allow cam block 34 (Fig. 9) to have spring end 36 bear directly thereon. There is in response to the load action a flexing between the two spaced holders as to the one member, which extent of flexing, as shown in dotted lines in Fig. 1, is somewhat magnified, and this flexing may be subject to further action modification by the cushioning block 23 therealong.

There is accordingly in this showing herein a smoothly responsive spring for a range of operation gradually building up against concussion-like response as the load increases. This gives a smoothness in general response as a factor in longevity to the equipment as against abrupt concussion hazards as well as comfort for passengers, whether it be in bus service or truck service.

What is claimed and it is desired to secure by Letters Patent is:

1. Cushioning mechanisms between a vehicle wheel and a vehicle frame member embodying an axle member for the wheel between said members, a semi-elliptic spring having a shackle and mid-holder connected to one member, said spring having a free end remote from the shackle, and a longitudinally rigid swinging arm having rigid connection to the other member and having pivotal connection to said one member, said arm remote from the pivotal connection providing a seat coacting with the free end of the spring, and so constructed that in response to load change the spring has variation in smoothly progressive cooperation with the arm in movement along the seat in varying the effective length of the arm and spring and the seat being controlled to shift with the arm.

2. Cushioning mechanisms between a vehicle wheel and a vehicle frame embodying axle means for the wheel, between axle means and frame a semi-elliptic spring having a shackle and mid-holder each connected to the frame, said spring having a free end remote from the shackle, and a longitudinally rigid swinging arm having rigid connection with the axle means and pivotal connection to the frame, said arm remote from the pivotal connection providing a seat coacting with the free end of the spring, and so constructed that in response to load change the spring has variation in smoothly progressive cooperation with the arm in movement along the seat in varying the effective length of the arm and spring and the seat being controlled to shift with the arm.

3. Cushioning mechanisms between a vehicle wheel and a vehicle frame embodying axle means for the wheel, between the axle means and frame a semi-elliptic spring having a shackle and mid-holder each connected to the frame, said spring having a free end remote from the shackle, and a longitudinally rigid swinging arm having rigid connection with the axle means and pivotal connection to the frame, there being cam seat coaction between the spring free end and said arm, and so constructed that in response to load change the spring has variation in smoothly progressive cooperation with the arm in movement along the seat in varying the effective length of the arm and spring and the seat being controlled to shift with the arm.

4. Cushioning mechanisms between a vehicle wheel and a vehicle chassis member embodying an axle member for the wheel between said members, a semi-elliptic spring having a shackle and mid-holder connected to one member, said spring having a free end remote from the shackle, a longitudinally rigid swinging arm having rigid connection to said other member and having pivotal connection to said one member, said arm remote from the connection providing a seat coacting with the free end of the spring and so constructed that in response to load change the spring has variation in smoothly progressive cooperation with the arm in movement along the seat in varying the effective length of the arm and spring and the seat being controlled to shift with the arm, and spring flex limiting means between the holder and shackle.

5. Cushioning mechanisms between a vehicle wheel and a vehicle frame embodying axle means for the wheel, between the axle means and frame a semi-elliptic spring having a shackle and mid-holder each connected to the frame, said spring having a free end remote from the shackle, a longitudinally rigid swinging arm having rigid connection with the axle means and pivotal connection to the frame, there being cam seat coaction between the spring free end and said arm, and so constructed that in response to load change the spring has variation in smoothly progressive cooperation with the arm in movement along the seat in varying the effective length of the arm and spring and the seat being controlled to shift with the arm, and spring flex yieldable limiting means between the holder and shackle.

6. Cushioning mechanism between a vehicle wheel and a vehicle chassis member embodying an axle member for the wheel, between said members a leaf spring, holder connection means for assembling the spring with one member, said spring having a free end, a longitudinally rigid swinging arm having rigid connection to the other member and having pivotal connection to the one member, and remote from said pivotal connection a cushioning face seat spacing the spring free end from said arm, and so constructed that in response to load change the spring has variation in smoothly progressive cooperation with the arm in movement along the seat in varying the effective length of the arm and spring and the seat being controlled to shift with the arm.

7. Cushioning mechanism between a vehicle wheel and a vehicle frame embodying axle means for the wheel, between said axle means and frame a leaf spring, holder connection means for assembling the leaf spring with the frame, said leaf spring having a free end, a longitudinally rigid swinging arm having rigid connection with the axle means and pivotal connection with the frame, and remote from said pivotal connection a compressible rubber-like face seat spacing the spring from said arm, and so constructed that in response to load change the spring has variation in smoothly progressive cooperation with the arm in movement along the seat in varying the effective length of the arm and spring and the seat being controlled to shift with the arm.

8. Cushioning mechanisms between a vehicle wheel and a vehicle frame embodying axle means for the wheel, between the axle means and frame a semi-elliptic spring, a terminal guide holder and a mid-holder for the spring, each connected to the frame, said spring having a free end remote from the guide holder, a longitudinally rigid swinging arm having rigid connection with the axle means and pivotal connection to the frame, cam seat providing means coacting between the spring free end and said arm, and spring flex yieldable limiting means between the holders.

9. Cushioning mechanisms between a vehicle wheel and a vehicle frame embodying axle means for the wheel, between the axle means and frame a semi-elliptic spring, a terminal guide holder and a rockable mid-holder for the spring, said mid-holder comprising dissimilar angle nested V-bearing means, each connected to the frame, said spring having a free end remote from the guide holder, and a longitudinally rigid swinging arm having rigid connection with the axle means and pivotal connection to the frame, said arm being provided with a seat engaged by the spring free end and so constructed that in response to load change the spring has variation in smoothly progressive cooperation with the arm in movement of the seat in varying the effective length of the arm and spring, the said seat being fixed to move with the direction of said arm.

10. Cushioning mechanisms between a vehicle wheel and a vehicle frame embodying axle means for the wheel, between the axle means and frame a semi-elliptic spring, a terminal guide cam holder and a mid-holder therefor, each connected to the frame, said spring having a free end remote from the guide holder, and a longitudinally rigid swinging arm having rigid connection with the axle means and pivotal connection to the frame, said arm being provided with a seat engaged by the spring free end, and so constructed that in response to load change the spring has variation in smoothly progressive cooperation with the arm in movement of the seat in varying the effective length of the arm and spring, the said seat being fixed to move with the direction of said arm.

11. Cushioning mechanism between a vehicle wheel and a vehicle chassis member embodying an axle member for the wheel, between said members a leaf spring, holder connection means for the spring with one member, said spring having a free end, a longitudinally rigid swinging arm having rigid connection to the other member and having pivotal connection to the one member, and remote from said pivotal connection a progressively effective cushioning face seat spacing the spring free end from said arm and so constructed that in response to load change the spring has variation in smoothly progressive cooperation with the arm in movement along the seat in varying the effective length of the arm and spring and the seat being controlled to shift with the arm.

12. Cushioning mechanisms between a vehicle wheel and a vehicle frame embodying axle means for the wheel, between the axle means and frame a semi-elliptic spring, a terminal holder and a rockable clamp mid-holder for the spring, each connected to the frame, said spring having a free end remote from the guide holder, and a longitudinally rigid swinging arm having rigid connection with the axle means and pivotal connection to the frame, said arm being provided with a seat engaged by the spring free end and so constructed that in response to load change the spring has variation in smoothly progressive cooperation with the arm in movement of the seat in varying the effective length of the arm and spring, the said seat being fixed to move with the direction of said arm.

13. Cushioning mechanisms between a vehicle wheel and a vehicle frame embodying axle means for the wheel, between the axle means and frame a semi-elliptic spring, a terminal holder and a mid-holder for the spring, each connected to the frame, said spring having a free end remote from the guide holder, and a longitudinally rigid swinging arm having rigid connection with the axle means and pivotal connection to the frame, said arm being engaged by the spring free end and so constructed as to have smoothly progressive cooperation of its face with the free end of the spring in response to load change to vary the effective distances of the terminal guide holder and arm at the free end from said mid-holder due to the guiding action of said arm and the spring engaging portion of the arm being fixed to move with the direction of said arm.

NIELS E. HENDRICKSON.